US009251573B2

United States Patent
Kobayashi (10) Patent No.: US 9,251,573 B2
(45) Date of Patent: Feb. 2, 2016

(54) DEVICE, METHOD, AND STORAGE MEDIUM FOR HIGH DYNAMIC RANGE IMAGING OF A COMBINED IMAGE HAVING A MOVING OBJECT

(75) Inventor: Hiroyuki Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 542 days.

(21) Appl. No.: 13/596,237

(22) Filed: Aug. 28, 2012

(65) Prior Publication Data

US 2013/0136364 A1 May 30, 2013

(30) Foreign Application Priority Data

Nov. 28, 2011 (JP) .................................. 2011-259086

(51) Int. Cl.
*G06T 5/00* (2006.01)
*G06T 7/20* (2006.01)

(52) U.S. Cl.
CPC ............... *G06T 5/009* (2013.01); *G06T 7/2006* (2013.01); *G06T 2207/20076* (2013.01); *G06T 2207/20208* (2013.01)

(58) Field of Classification Search
None
See application file for complete search history.

(56) References Cited

U.S. PATENT DOCUMENTS

| 2009/0059039 A1* | 3/2009 | Smith et al. ................... 348/241 |
| 2011/0188744 A1* | 8/2011 | Sun ................................ 382/162 |
| 2011/0222793 A1* | 9/2011 | Ueda et al. .................... 382/284 |
| 2012/0086829 A1* | 4/2012 | Hohjoh ...................... 348/223.1 |

FOREIGN PATENT DOCUMENTS

JP 2004-254151 9/2004

* cited by examiner

*Primary Examiner* — Jayesh A Patel
*Assistant Examiner* — Geoffrey E Summers
(74) *Attorney, Agent, or Firm* — Staas & Halsey LLP (57) ABSTRACT

A device that combines a first image photographed with a first amount of exposure and a second image photographed with a second amount of exposure lower than the first amount of exposure, thereby generating a combined image having a wider dynamic range than a dynamic range for the amounts of exposure of the first and second images, the device includes a motion region extraction unit configured to extract at least one motion region in which an object moving between the first image and the second image is shown; a combining ratio determining unit configured to increase a combining ratio of the second image to the first image for a pixel in a background region outside of the at least one motion region such that the higher a luminance value of a pixel of the first image, the higher the combining ratio.

11 Claims, 8 Drawing Sheets

|  |  | PHOTOGRAPHIC SENSITIVITY VALUE | | | |
|---|---|---|---|---|---|
|  |  | ~99 | 100~199 | 200~399 | ... |
| COMBINING TABLE REFERENCE VALUE | : | : | : | : | : |
|  | 50 | 0.5 | 0.55 | 0.6 | : |
|  | : | : | : | : | : |
|  | 100 | 0.5 | 0.5 | 0.6 | : |
|  | : | : | : | : | : |
|  | 150 | 0.4 | 0.4 | 0.4 | : |
|  | : | : | : | : | : |
|  | 200 | 0.3 | 0.35 | 0.4 | : |
|  | : | : | : | : | : |

DEVICE, METHOD, AND STORAGE MEDIUM FOR HIGH DYNAMIC RANGE IMAGING OF A COMBINED IMAGE HAVING A MOVING OBJECT

CROSS-REFERENCE TO RELATED APPLICATION(S)

This application is based upon and claims the benefit of priority of the prior Japanese Patent Application No. 2011-259086, filed on Nov. 28, 2011, the entire contents of which are incorporated herein by reference.

FIELD

The embodiment discussed herein is related to an image combining device and method that, for example, combine a plurality of images having different amounts of exposure, thereby generating a combined image, and a computer-readable storage medium storing an image combining program.

BACKGROUND

To date, an image sensor using a charge-coupled device has been widely utilized in photographic apparatuses, such as digital cameras. Some photographic subjects, however, have contrasts exceeding the dynamic range of the image sensor. For example, a photographic subject may include an object exposed to sunlight (hereinafter referred to as a "bright object" for the sake of convenience) and an object placed in the shade (hereinafter referred to as a "dark object" for the sake of convenience). In such a case, if the exposure amount of a photographic apparatus is adjusted so as to make a dark object visible in an image, the luminance of a bright object exceeds the upper limit of the dynamic range of the image sensor, and, as a result, the bright object is shown as a solid white object in the image. In contrast, if the exposure amount of the photographic apparatus is adjusted so as to make a bright object visible in an image, the luminance of a dark object is lower than the lower limit of the dynamic range of the image sensor, and, as a result, the dark object is shown as a solid black object in the image.

To address this, a technology that combines a plurality of images obtained by photographing a subject with different amounts of exposure to virtually extend the dynamic range of an image sensor has been proposed (see Japanese Laid-open Patent Publication No. 2004-254151, for example). Such a technology is referred to as high dynamic range (HDR) imaging.

For example, Japanese Laid-open Patent Publication No. 2004-254151 discloses an imaging device that combines a first image signal obtained by photographing with a large amount of exposure and a second image signal obtained by photographing with a small amount of exposure. The imaging device uses a second image signal for a region of a moving photographic subject and a saturation region of the first image signal, for example. Regarding other regions, the imaging device varies the proportions accounted for by the first image and the second image, for example, in such a manner that, with increasing proximity to the saturation level of the first image signal, the larger the proportion accounted for by the second image signal. Under such a condition, the imaging device performs image combining.

SUMMARY

In accordance with an aspect of the embodiments, a device that combines a first image photographed with a first amount of exposure and a second image photographed with a second amount of exposure lower than the first amount of exposure, thereby generating a combined image having a wider dynamic range than a dynamic range for the amounts of exposure of the first and second images, the device includes a motion region extraction unit configured to extract at least one motion region in which an object moving between the first image and the second image is shown; a combining ratio determining unit configured to increase a combining ratio of the second image to the first image for a pixel in a background region outside of the at least one motion region such that the higher a luminance value of a pixel of the first image, the higher the combining ratio, and to set the combining ratio at a given luminance value such that the higher a ratio of a noise component to a signal component of a pixel of the at least one motion region in the second image, the higher the combining ratio at the given luminance value; and an image combining unit configured to determine the luminance value of a pixel of the combined image in the at least one motion region on the basis of a luminance value of a corresponding pixel of the second image, and to find a luminance value of a pixel of the combined image in the background region as a value obtained by combining luminance values of corresponding pixels of the first image and the second image in accordance with the combining ratio, thereby generating the combined image.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENT

This image combining device combines a high exposure image photographed with a relatively high amount of exposure and a low exposure image photographed with a relatively low amount of exposure, thereby generating a combined image having a wider dynamic range than the dynamic range for the amounts of exposure of the high exposure image and the low exposure image. At that point, for a motion region in which a photographic subject moves between the high exposure image and the low exposure image and a region that is included in the high exposure region and in which the luminance value is saturated, the image combining device basically determines, on the basis of the luminance value of a pixel in the region in question of the low exposure image, the luminance value of the corresponding pixel of the combined image. Also regarding a background region other than the motion region, the image combining device increases a combining ratio of the low exposure image to the high exposure image such that the higher the luminance value of a pixel of the high exposure image included in the background region, the higher the combining ratio is increased, and performs alpha blending of the high exposure image and the low exposure image. Here, the image combining device suppresses generation of a difference in image quality between the motion region and the background region that is caused by a difference in the signal-to-noise (SN) ratio between the high exposure image and the low exposure image. For that purpose, this image combining device sets the combining ratio such that the lower the SN ratio of the low exposure image, the higher the combining ratio of the low exposure image at a given luminance value of a pixel in the background region. Furthermore, this image combining device determines a representative luminance value for every motion region. Then, when the representative luminance value is less than the lower limit of the representative luminance value to which degradation in image quality caused by combining is permissible, the corresponding motion region is deleted.

Note that it is to be understood that the terms "high exposure" and "low exposure" represent a relatively large amount of exposure and a relatively small amount of exposure, respectively, and do not represent absolute values of the amounts of exposure. That is, a "high exposure image" is an image obtained by photographing a subject with a relatively larger degree of exposure than that of a "low exposure image"; in contrast, the "low exposure image" is an image obtained by photographing a subject with a relatively smaller degree of exposure than that of the "high exposure image".

In this embodiment, assume that the high exposure image, the low exposure image, and the combined image are gray images in which each pixel has only a luminance value. However, the high exposure image, the low exposure image, and the combined image may be, for example, color raw images in which each pixel has only one color component among a red component, a green component, and a blue component.

Figure 1:
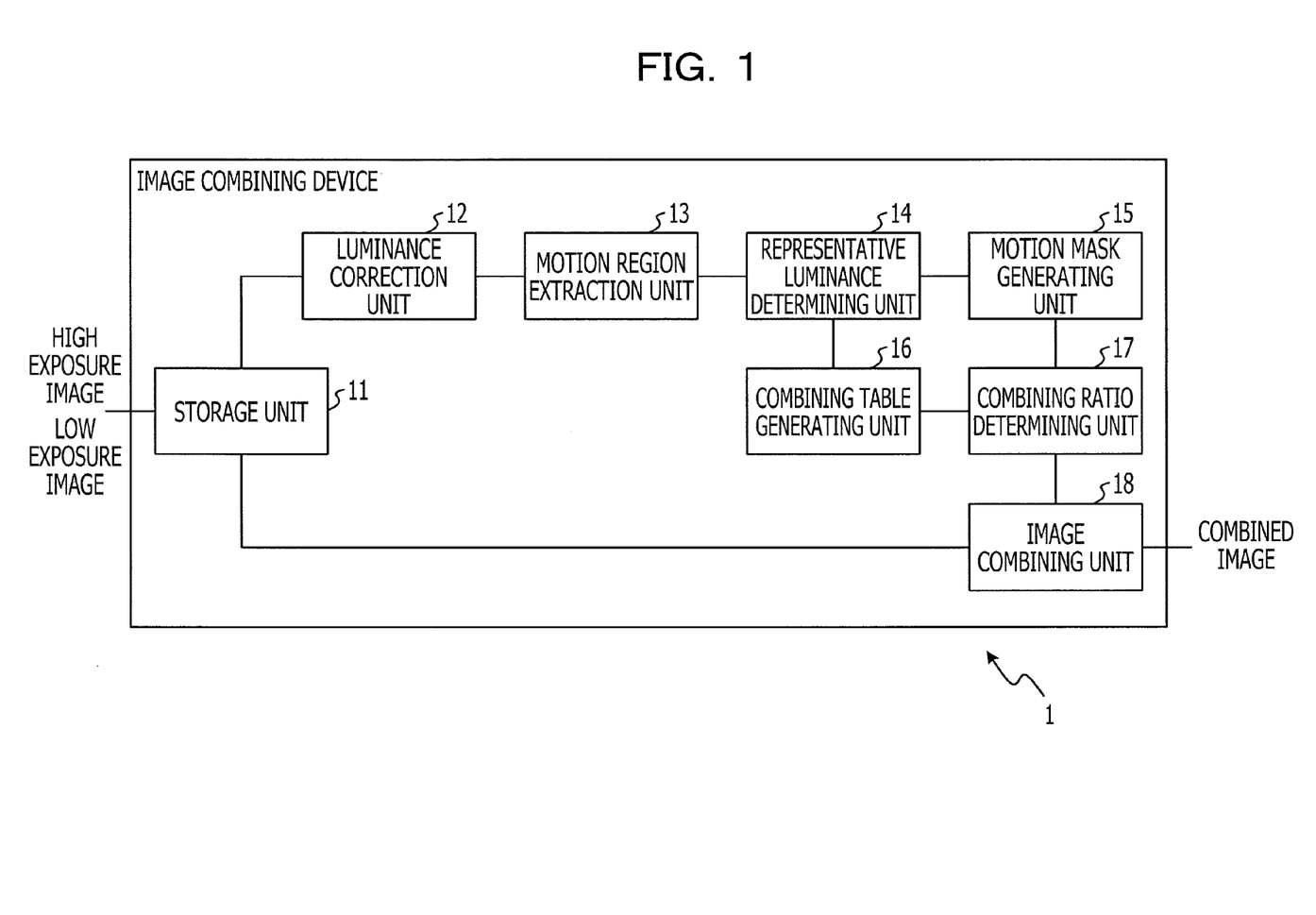
FIG. 1 is a block diagram of an image combining device according to an embodiment.

FIG. 1 is a block diagram of an image combining device according to an embodiment. An image combining device 1 includes a storage unit 11, a luminance correction unit 12, a motion region extraction unit 13, a representative luminance determining unit 14, a motion mask generating unit 15, a combining table generating unit 16, a combining ratio determining unit 17, and an image combining unit 18. These components included in the image combining device 1 are formed as separate circuits. These components included in the image combining device 1 may be form one integrated circuit in which circuits corresponding to the components are integrated. Alternatively, these components included in the image combining device 1 may be made up of a processor, a memory circuit, and firmware, which is a combination of computer programs that, when executed on the processor, implement functions of the components.

The image combining device 1 is, for example, built into a photographic apparatus such as a digital camera or a mobile telephone with a camera. The image combining device 1 receives a high exposure image and a low exposure image that are generated by an image sensor having charge-coupled devices two-dimensionally arranged therein. The image sensor is included in the photographic apparatus. Then, the image combining device 1 stores the received high exposure image and low exposure image in the storage unit 11. In addition, the image combining device 1 receives setting information representing photographic sensitivities at times of generation of the high exposure image and the low exposure image, an index indicating the amount of exposure at the time of generation of the high exposure image, and an index indicating the amount of exposure at the time of generation of the low exposure image, and causes the setting information and indices to be stored in the storage unit 11.

In order to change the amount of exposure, when the shutter speed of a digital camera is adjusted, for example, the image combining device 1 receives a time of exposure at the time of generation of a high exposure image and a time of exposure time at the time of generation of a low exposure image as indices indicating the amounts of exposure. Also, in order to change the amount of exposure, when the diameter of an iris diaphragm of a digital camera is adjusted, for example, the image combining device 1 receives an F-number at the time of generation of a high exposure image and an F-number at the time of generation of a low exposure image as indices indicating the amounts of exposure. Alternatively, the image combining device 1 may receive both times of exposure and F-numbers as indices indicating the amounts of exposure.

Note that, in this embodiment, the luminance value of each pixel in the high exposure image and the low exposure image is represented by 10 bits, and it is assumed that the larger the value, the higher the luminance.

The storage unit 11 has a nonvolatile or volatile semiconductor memory capable of being read and written to, for example. The storage unit 11 stores a high exposure image, a low exposure image, setting information on photographic sensitivities, indices of the amounts of exposure at times of generation of the high exposure image and the low exposure image.

In order to cancel a difference in the value of each pixel caused by a difference in the amount of exposure between a high exposure image and a low exposure image, the luminance correction unit 12 corrects the luminance value of each pixel of the low exposure image in accordance with the difference in the amount of exposure. For example, assume that the amount of exposure of a high exposure image is $2^n$ times the amount of exposure of a low exposure image, that is, the high exposure image and the low exposure image differ in exposure value (EV) by n steps (where n is an integer of 1 or more). In this case, the luminance correction unit 12 expands the bit length representing the luminance value of each pixel of the high exposure image and the low exposure image, by n bits. Then, the luminance correction unit 12 increases the luminance value of each pixel of the low exposure image $2^n$ times. For example, in the case where the amount of exposure of the high exposure image is 4 times the amount of exposure of the low exposure image, the luminance correction unit 12 expands the bit length representing the luminance value of each pixel of the high exposure image and the low exposure image from 10 bits to 12 bits, so that the luminance value of each pixel of the low exposure image is increased 4 times. Expanding the bit length representing the luminance value inhibits the luminance value of each pixel of the low exposure image from being saturated even after that luminance value is corrected in accordance with the difference in the amount of exposure.

The luminance correction unit 12 causes the high exposure image for which the bit length has been expanded and the low exposure image for which the bit length has been expanded and that has been corrected to be stored in the storage unit 11 and delivers the high exposure image and the low exposure image to the motion region extraction unit 13. Hereinbelow, a low exposure image for which the bit length has been expanded and that has been corrected is referred to simply as a "corrected low exposure image" for the sake of convenience.

The motion region extraction unit 13 extracts motion regions in which, among photographic subjects shown in a low exposure image or a high exposure image, a photographic subject moving between a time of capturing the low exposure image and a time of capturing the high exposure image is shown. For that purpose, the motion region extraction unit 13 performs a difference operation between pixels corresponding to each other of a corrected low exposure image and a high exposure image to calculate an absolute difference value for every pixel. Then, the motion region extraction unit 13 extracts pixels the absolute difference values for which are equal to or larger than a given threshold, as motion candidate pixels. Note that the given threshold is set to, for example, a value equivalent to 10% of the upper limit of values that the luminance may take. For example, when the bit length representing the luminance value of a pixel of a high exposure image is 10 bits, the given threshold is set to 102.

The motion region extraction unit 13 performs labeling processing on motion candidate pixels, and attaches a label to every set of motion candidate pixels adjacent to each other. Then, the motion region extraction unit 13 regards each set of individual motion candidate pixels as one motion candidate region. Furthermore, the motion region extraction unit 13 may perform a closing operation of morphology on motion candidate pixels so as to cause isolated motion candidate pixels to be included in any of motion candidate regions.

The motion region extraction unit 13 extracts motion candidate regions in which the number of pixels included therein is equal to or larger than a given number, among motion candidate regions, as motion regions. Note that the given number is set to the number of pixels that is equivalent to the minimum of the assumed size of a photographic subject in an image, for example. For example, the given number is set to be 1/1000 to 1/10000 of the total number of pixels of a high exposure image.

Alternatively, the motion region extraction unit 13 may extract motion regions using a technique of calculating optical flow. In this case, the motion region extraction unit 13 divides each of the corrected low exposure image and high exposure image into a plurality of blocks, performs block matching for every block, thereby obtaining a motion vector between a block of the low exposure image and a block of the high exposure image having a best match therewith. The motion region extraction unit 13 extracts blocks of the low exposure image and blocks of the high exposure image the motion vectors between which each have a size equal to or larger than a given size (e.g., 5 pixels), as motion candidate blocks. Then, the motion region extraction unit 13 may perform labeling processing on motion candidate blocks, regard sets of motion candidate blocks adjacent to each other as motion candidate regions, and extract motion candidate regions in which the number of pixels included therein is equal to or larger than the given number, as motion regions. Furthermore, the motion region extraction unit 13 may extract motion regions using any of other various techniques for extracting motion regions between two images.

The representative luminance determining unit 14 obtains a representative luminance value for each motion region. The representative luminance value is a representative of luminance values of pixels in a motion region and serves as a reference for creating a combining table representing the relationship between the luminance value of a high exposure image and the combining ratio. For example, the representative luminance determining unit 14 regards the minimum of luminance values of pixels of the high exposure image in the motion region, as a representative luminance value for each motion region. Alternatively, the representative luminance determining unit 14 may create a cumulative histogram of luminance values of pixels of the high exposure image in the motion region, and regard a luminance value whose cumulative frequency from the minimum of luminance values of pixels in the motion region reaches a given percentage (e.g., 5%), as a representative luminance value. Alternatively, the representative luminance determining unit 14 may regard the average or median of luminance values of pixels of the high exposure image in the motion region, as a representative luminance value.

Note that the representative luminance determining unit 14 may use only luminance values of pixels located within a range of a given number of pixels from the boundary of the motion region, and regard, among them, the minimum luminance value of the high exposure image or a luminance value whose cumulative frequency reaches a given percentage, as a representative luminance value, as mentioned above. In this way, the representative luminance determining unit 14 refers only to luminance values of pixels located in the vicinity of the boundary of the motion region in order to determine a representative luminance. This allows the representative luminance determining unit 14 to set a representative luminance value that more readily reflects influence on a difference in image quality between the motion region and its peripheral region in a combined image. Note that the given number of pixels is set to 1 to 5, for example.

The motion mask generating unit 15 is an example of a motion region selection unit. The motion mask generating unit 15 deletes a motion region whose representative luminance value is less than a combining limit value even with use of the luminance values of pixels in a region corresponding to the motion region in a low exposure image, among motion regions. The combining limit value is the lower limit of representative luminance values with which image quality of a combined image is allowed.

The combining limit value is determined by, for example, checking a difference in subjective image quality for various groups each composed of a high exposure image and a low exposure image obtained by photographing an identical subject, and obtaining the minimum of representative luminance values when the subjective difference is within an allowable range. Note that the combining limit value may be set such that the lower the photographic sensitivity of an image sensor, the lower the combining limit value. This is because the lower the photographic sensitivity of an image sensor, the larger the amount of light per pixel corresponding to a given luminance value and therefore the higher the SN ratio.

Figure 2A:
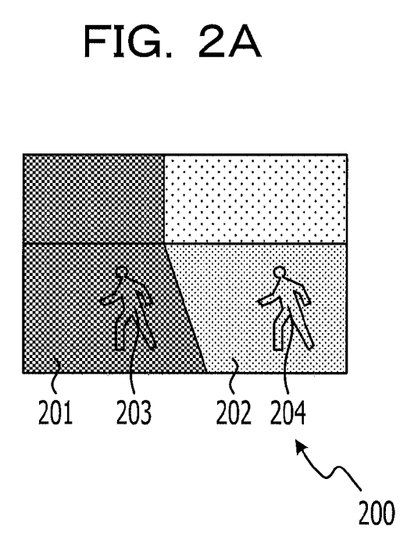
FIG. 2A illustrates an example of a low exposure image.
Figure 2B:
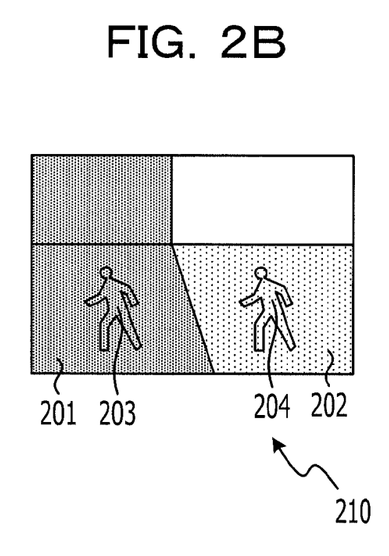
FIG. 2B illustrates an example of a high exposure image.
Figure 2C:
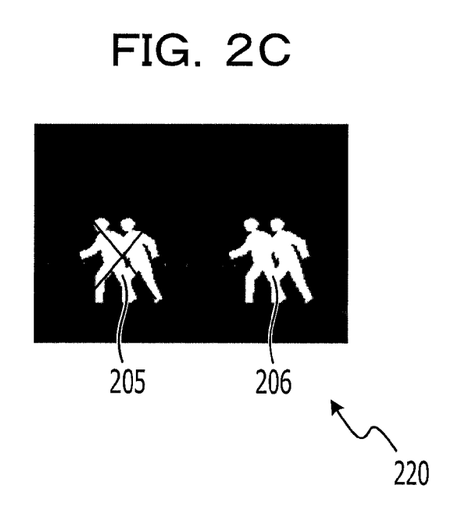
FIG. 2C illustrates an example of a motion region obtained from the low exposure image illustrated in FIG. 2A and the high exposure image illustrated in FIG. 2B.

FIG. 2A illustrates an example of a low exposure image, and FIG. 2B illustrates an example of a high exposure image. FIG. 2C illustrates an example of a motion region obtained from the low exposure image illustrated in FIG. 2A and the high exposure image illustrated in FIG. 2B.

Each of the low exposure image 200 and the high exposure image 210 includes a dark region 201, which is in shadow and therefore dark, and a bright region 202, which is illuminated and therefore bright. Objects 203 and 204 that are moving are shown in the dark region 201 and the bright region 202, respectively. Therefore, a motion region 205 corresponding to the object 203 and a motion region 206 corresponding to the object 204 are extracted in an image 220 representing a motion region.

Unfortunately, since the object 203 is located in the dark region 201, a region corresponding to the motion region 205 in the low exposure image 200 has a low S/N ratio and has low image quality. Therefore, if the luminance values of pixels in the motion region 205 are determined on the basis of the luminance values of the corresponding pixels of the low exposure image 200, the image quality of the motion region 205 is lower than the image quality of the surroundings in a combined image, resulting in degradation of image quality of the entire combined image. However, the representative luminance value of the motion region 205 is also low, and therefore the motion region 205 is deleted according to this embodiment. Accordingly, the combining ratios of pixels in the motion region 205 are determined in accordance with a combining table mentioned below.

In contrast, since the object 204 is in the bright region 202, a region corresponding to the motion region 206 in the low exposure image 200 has a high SN ratio and also has better image quality than the motion region 205. Therefore, if the luminance values of pixels in the motion region 206 are determined on the basis of the luminance values of the corresponding pixels of the low exposure image 200, there is a small difference between the image quality of the motion region 206 and the image quality of the surroundings in a combined image. Thus, the motion region 206 is maintained.

For each of motion regions that still remain, the motion mask generating unit 15 generates a motion mask that specifies the combining ratio of a low exposure image to a high exposure image for a pixel contained in a motion region. For example, for a motion region whose representative luminance value is equal to or larger than a combining limit value, the motion mask generating unit 15 generates a motion mask that causes the combining ratio of the low exposure image to be 1 in the motion region and to be 0 in regions other than the region. Note that a motion mask is generated as an image having the same size as that of a low exposure image, for example, and the motion mask value of each pixel of the image represents the combining ratio of the corresponding pixel of the low exposure image in 8 bit length. For example, the combining ratio of the low exposure image to the high exposure image is 0 for a pixel whose motion mask value is 0, and the combining ratio of the low exposure image to the high exposure image is 1 for a pixel whose motion mask value is 255.

The motion mask generating unit 15 may generate a motion mask such that the closer the position of a pixel is to the center of a motion region from the boundary thereof, the higher the combining ratio of the low exposure image to the high exposure image. For example, the motion mask generating unit 15 may set the combining ratio in a pixel in the motion region and adjacent to the boundary thereof to 0.5, and increase the combining ratio by 0.05 or 0.1 with increasing distance from the boundary by 1 pixel. This may inhibit a steep change in combining ratio between the motion region and its surroundings, so that the boundary between the motion region and its surroundings is less conspicuous.

The combining table generating unit 16 adjusts a combining table for determining the combining ratio of the low exposure image to the high exposure image in the entire combined image including a background region other than a motion region, on the basis of the representative luminance value of the motion region.

For this purpose, the combining table generating unit 16 initially determines a combining table reference value, which is a luminance value used as a reference for adjusting the combining table. In this embodiment, the combining table generating unit 16 compares a statistical luminance value, which is a statistical central value of representative luminance values of motion regions, to the above combining limit value, and determines the larger of these values as the combining table reference value. Note that the statistical luminance value may be, for example, the minimum of representative luminance values of motion regions, or the average or median of the representative luminance values of motion regions.

Figure 3A:
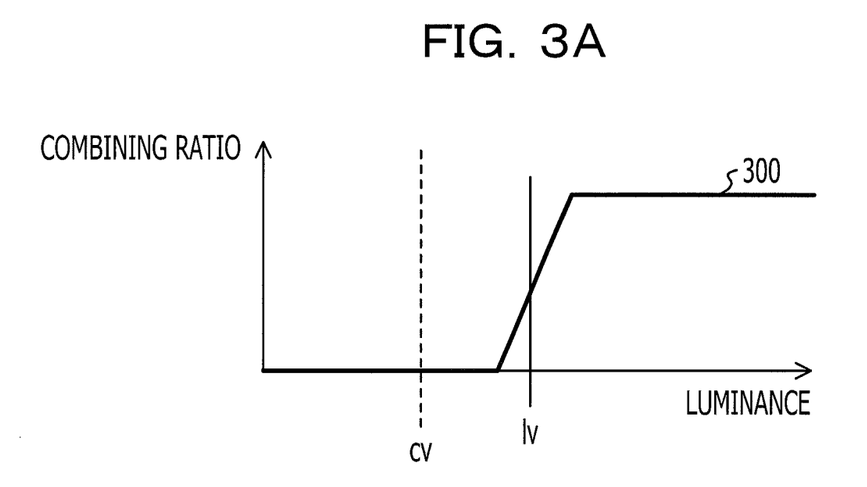
FIG. 3A illustrates the relationship of the combining limit value and the statistical luminance value relative to the combining ratio.
Figure 3B:
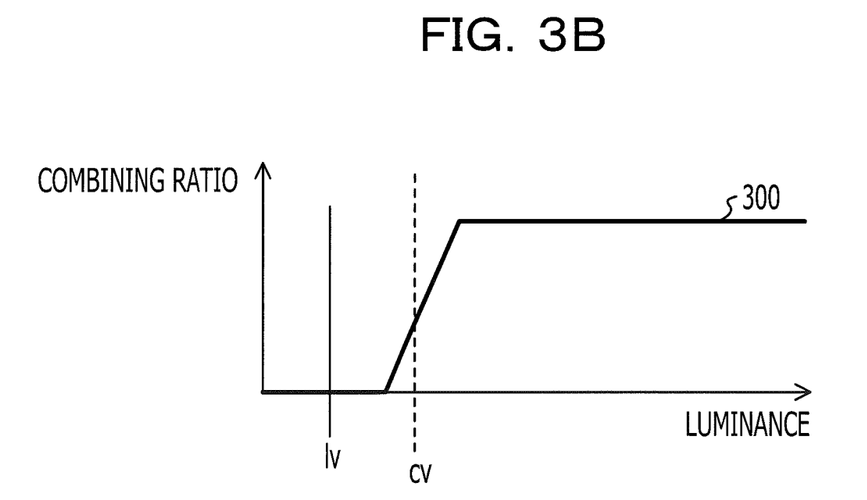
FIG. 3B illustrates the relationship of the combining limit value and the statistical luminance value relative to the combining ratio.

FIG. 3A and FIG. 3B each illustrate the relationship of the combining limit value and the statistical luminance value relative to the combining ratio. In FIG. 3A and FIG. 3B, the horizontal axis represents the luminance, and the vertical axis represents the combining ratio of the low exposure image to the high exposure image.

As illustrated in FIG. 3A, when a statistical luminance value lv is higher than a combining limit value cv, the relationship between the luminance value and the combining ratio is determined as represented by a graph 300 such that the combining ratio at the statistical luminance value lv has a given value. That is, when the luminance values of pixels in each motion region of a high exposure image are high on average, the luminance values of pixels of the corresponding region of a low exposure image are also high on average, and the SN ratio in that corresponding region is also high. Therefore, in this case, the combining table reference value is determined in accordance with the representative luminance value of a motion region, and, as a result, regarding pixels in a background region having luminance values similar to those of pixels of the high exposure image in the motion region, a signal component of the low exposure image will be contained to some extent. Accordingly, the image combining device 1 may decrease the difference in the SN ratio between the motion region and the background region.

In contrast, as illustrated in FIG. 3B, when the statistical luminance value lv is equal to or lower than the combining limit value cv, the relationship between the luminance value and the combining ratio is determined as represented by a graph 310 such that the combining ratio at the combining limit value cv has a given value. That is, when the luminance values of pixels in each motion region of the high exposure image are low on the whole, the luminance values of pixels of the corresponding region of the low exposure image are, of course, low on the whole, and, as a result, the SN ratio in that corresponding region of the low exposure image is also low. Therefore, in this case, the combining table reference value is determined in accordance with the representative luminance value, so that the image quality of the entire combined image is inhibited from being degraded in accordance with the image quality of the low exposure image.

The combining table generating unit 16 determines a reference combining ratio, which is a combining ratio of the low exposure image at the combining table reference value, referring to a low-exposure-image allowable ratio table that represents the corresponding relationship of the combining ratio with respect to the combining table reference value as well as the photographic sensitivity.

Figure 4:
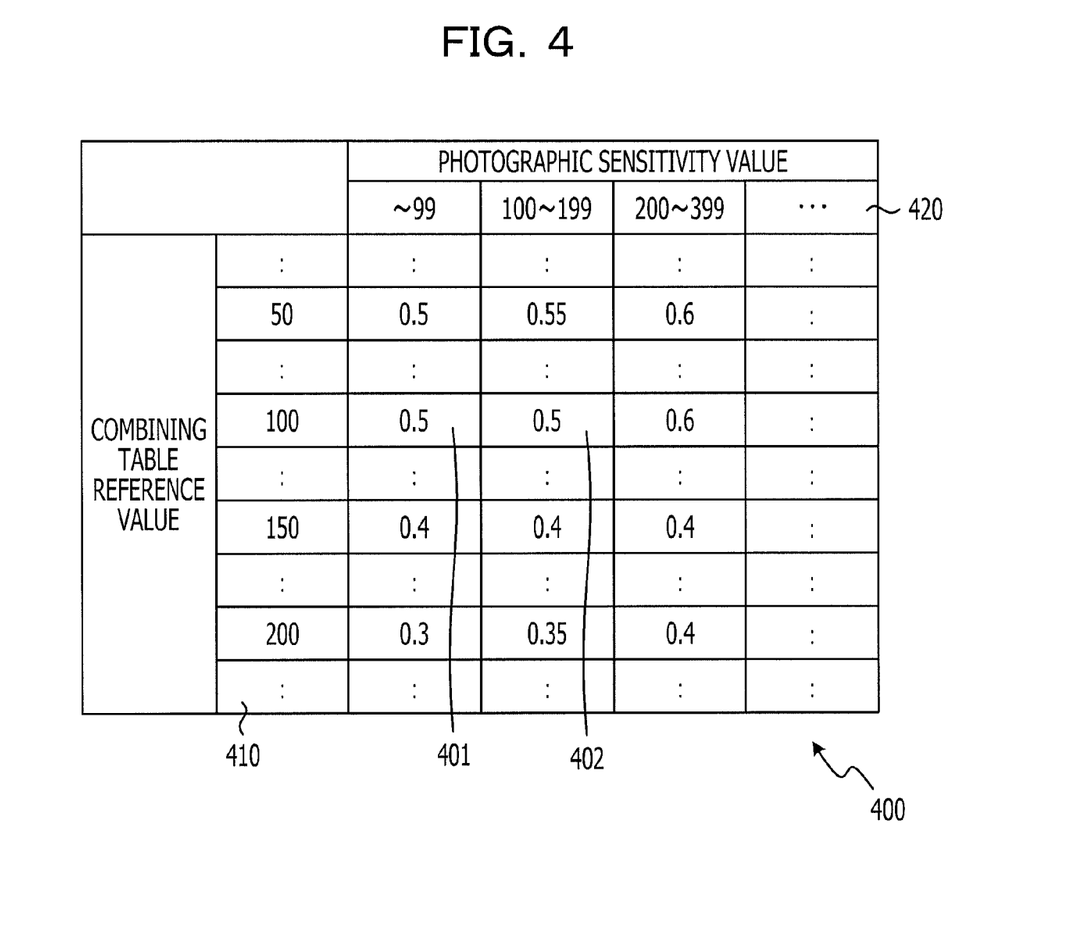
FIG. 4 illustrates an example of a low-exposure-image allowable ratio table.

FIG. 4 illustrates an example of a low-exposure-image allowable ratio table. In the low-exposure-image allowable ratio table 400, combining table reference values are illustrated in a leftmost column 410, and the photographic sensitivities are illustrated in a top row 420. Note that, in this example, the photographic sensitivity value is represented as the ISO speed value. The reference combining ratio corresponding to the combining table reference value and the photographic sensitivity is illustrated in each field of the low-exposure-image allowable ratio table 400. For example, as illustrated in a field 401, if the combining table reference value is 100 and the photographic sensitivity is less than 99, then the reference combining ratio will be 0.5. As illustrated in field 402, if the combining table reference value is 100 and the photographic sensitivity is 100 or more and less than 199, then the reference combining ratio will be 0.55.

As illustrated in FIG. 4A, the higher the photographic sensitivity, the higher the reference combining ratio. Accordingly, the higher the photographic sensitivity, the higher the proportion of the luminance component of the low exposure image at the luminance value of a pixel of a combined image will be in a background region, so that the SN ratio in the background region becomes closer to the SN ratio of a motion region of the low exposure image. As a result, if the luminance value of each pixel in the motion region in the combined image is equal to the luminance value of the corresponding pixel of the low exposure image, the difference in SN ratio between the motion region and the background region decreases. Therefore, in cases where the photographic sensitivity is high and the SN ratio of the low exposure image is low, the difference in image quality between the motion region and the background region is small.

Also, as illustrated in FIG. 4, the lower the combining table reference value, the higher the reference combining ratio at that combining table reference value. Accordingly, when the luminance value of each pixel in a motion region is generally low and the SN ratio is low, the SN ratio of a background region is also low. Therefore, in cases where the amount of light is small and the SN ratio of the low exposure image is low, the difference in image quality between the motion region and the background region is small.

The combining table generating unit 16 adjusts a reference combining table, which represents the relationship between the luminance and the combining ratio of the low exposure image and is set in advance, so that when the luminance value is equal to the combining table reference value, the combining ratio is equal to the reference combining ratio, thereby generating a combining table.

Figure 5:
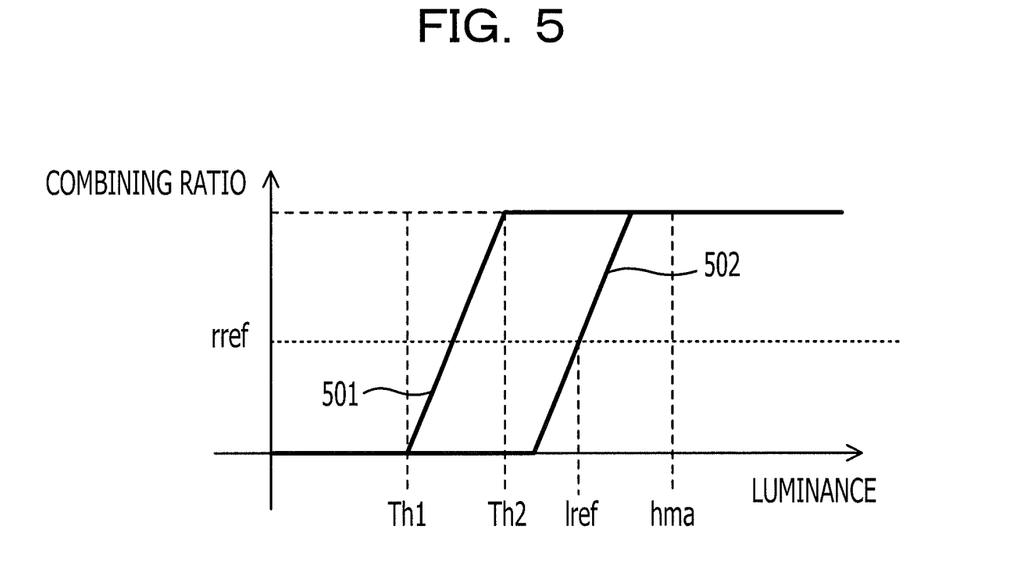
FIG. 5 illustrates the relationships between the luminance and the combining ratio represented in a reference combining table and a generated combining table.

FIG. 5 illustrates an example of the relationships between the luminance and the combining ratio represented in a reference combining table and a generated combining table. In FIG. 5, the horizontal axis represents the luminance, and the vertical axis represents the combining ratio of the low exposure image. A graph 501 illustrates the relationship between the luminance and the combining ratio that are represented in the reference combining table. Usually, the lower the luminance value of a pixel of the high exposure image, the lower the SN ratio of the corresponding pixel of the low exposure image. For this reason, as illustrated in FIG. 5, the reference combining table is preferably set such that the lower the luminance value of the high exposure image, the lower the combining ratio of the low exposure image. In this example, the luminance difference between a threshold Th1, which is the upper limit of luminance values of the high exposure image and at which the combining ratio of the low exposure image in the reference combining table is 0, and a threshold Th2, which is the lower limit of luminance values of the high exposure image and at which the combining ratio of the low exposure image is 1, is ld in the reference combining table. Then, the reference combining table is shifted in a direction of the luminance value so that the combining ratio at a combining table reference value lref is equal to a reference combining ratio rref while the luminance difference ld between the thresholds Th1 and Th2 is kept fixed, so that a combining table is generated. A graph 502 illustrates the relationship between the luminance and the combining ratio that are represented by the generated combining table.

Note that the low-exposure-image allowable ratio table and the reference combining table are stored in advance, for example, in a nonvolatile memory that is included in the combining table generating unit 16.

According to a modification, the low-exposure-image allowable ratio table may specify the values of the thresholds Th1 and Th2 for the combining table reference value and the photographic sensitivity. The combining table generating unit 16 determines the thresholds Th1 and Th2 directly from the combining table reference value and the setting information on photographic sensitivity by referring to the low-exposure-image allowable ratio table. In this case, the low-exposure-image allowable ratio table preferably specifies the thresholds Th1 and Th2 such that the higher the photographic sensitivity, the higher the combining ratio of the low exposure image. The low-exposure-image allowable ratio table also preferably specifies the thresholds Th1 and Th2 such that the lower the combining table reference value, the higher the combining ratio of the low exposure image.

In either case, the threshold Th2 is preferably set so as to be equal to or less than a maximum value hmax of luminance that the high exposure image may take. Accordingly, for a pixel having a saturated luminance value in the high exposure image, the luminance value of the corresponding pixel in the combined image is equal to the value of the corresponding pixel in the corrected low exposure image. Therefore, the dynamic range of an image sensor is artificially expanded.

The combining table generating unit 16 determines the combining ratio of the low exposure image to the high exposure image in each luminance value included between the thresholds Th1 and Th2 by linear interpolation of a combining ratio of 0 at the threshold Th1 and a combining ratio of 1 at the threshold Th2. Thus, the combining table specifies the combining ratio of the low exposure image for every luminance value. The combining table generating unit 16 represents the combining ratio at every luminance value, which is specified in the combining table, in the same bit length as the bit length representing the combining ratio of each pixel of a motion mask. Accordingly, for example, in the case where the combining ratio is represented in 8 bit length, if the combining ratio of the low exposure image is 0 at a luminance value of interest, the value of the combining ratio at the luminance value is represented by 0, whereas if the combining ratio of the low exposure image is 1 at a luminance value of interest, the value of the combining ratio at the luminance value is represented by 255.

The combining ratio determining unit 17 determines the combining ratio of the low exposure image to the high exposure image for every pixel of the combined image, on the basis of the combining table and the motion mask. In this embodiment, the combining ratio determining unit 17 determines a combining ratio CR(x, y) of a low exposure image of a horizontal coordinate x and a vertical coordinate y in accordance with the following expression.

$$CR(x,y)=\text{Max}(MV(x,y),BCR(Ph(x,y))) \quad (1)$$

where MV(x, y) represents the motion mask value of the horizontal coordinate x and the vertical coordinate y, and BCR(Ph(x, y)) represents a combining ratio that a combining table specifies for a luminance value Ph(x, y) of a pixel of the horizontal coordinates x and the vertical coordinates y of the high exposure image. Max(a, b) is a function that outputs the value of the larger of parameters a and b.

As described above, if the motion mask value of the pixel in a motion region is set to its maximum and the motion mask value of the pixel in a background region is set to its minimum, the combining ratio CR(x, y) will be 1 (255 when represented in 8 bit length) in the motion region. In contrast, in the background region, the combining ratio CR(x, y)=BCR (Ph(x, y)).

The image combining unit 18 reads a high exposure image for which the bit length has been expanded and a corrected low exposure image from the storage unit 11, and creates a combined image by performing alpha blending of the two images in accordance with the combining ratio of each pixel determined by the combining ratio determining unit 17. For example, the combining ratio determining unit 17 calculates the luminance value of each pixel of a combined image in accordance with the following expression.

$$Pc(x,y)=(Pl(x,y)*CR(x,y)+Ph(x,y)*(255-CR(x,y)))/255 \quad (2)$$

where Pl(x, y) represents the luminance value of a pixel of the horizontal coordinate x and the vertical coordinates y in a corrected low exposure image, and Ph(x, y) represents a luminance value Ph(x, y) of a pixel of the horizontal coordinate x and the vertical coordinate y of a high exposure image for which the bit length has been expanded. CR(x, y) represents the combining ratio of the low exposure image of the pixel of the horizontal coordinate x and the vertical coordinate y. This combining ratio is represented by a value in the range from 0 to 255. Pc(x, y) represents the luminance value of the pixel of the horizontal coordinate x and the vertical coordinate y in the combined image.

In this example, the bit length representing the luminance value of each pixel of the combined image is equal to a bit length obtained by addition of n bits to the bit length representing the luminance value of each pixel of the original high exposure image by the luminance correction unit 12. The image combining unit 18 may discard the lower-order n bits of a bit string representing the luminance value of each pixel of the combined image.

The image combining unit 18 outputs the generated combined image.

Figure 6A:
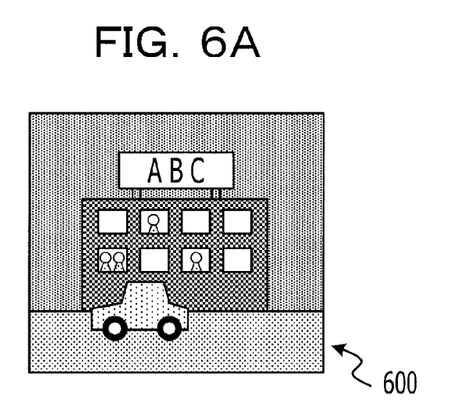
FIG. 6A illustrates an example of a low exposure image.
Figure 6B:
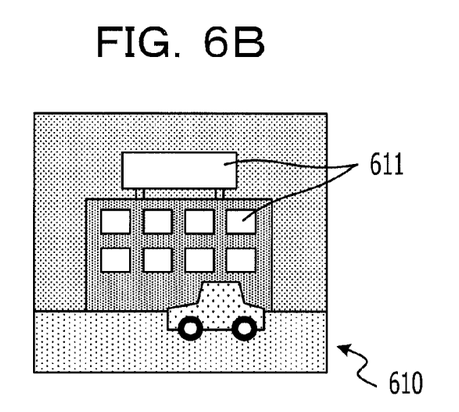
FIG. 6B illustrates an example of a high exposure image.

FIG. 6A illustrates an example of a low exposure image, and FIG. 6B illustrates an example of a high exposure image. In a low exposure image 600, since the SN ratio is low on the whole, a noise component is conspicuous except for regions in which bright objects, such as windows of a building or a sign board, are shown. In contrast, in a high exposure image 610, although the luminance of pixels in regions 611 in which bright objects, such as windows of a building and a sign board, are shown is saturated, a noise component is not conspicuous for relatively dark regions other than the regions 611.

Figure 6C:
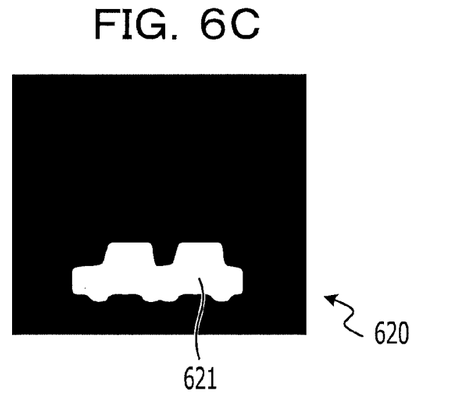
FIG. 6C illustrates an example of a motion mask obtained on the basis of the low exposure image and the high exposure image.

FIG. 6C illustrates an example of a motion mask obtained on the basis of the low exposure image 600 and the high exposure image 610. In a motion mask 620, a region in which a vehicle whose position varies between the low exposure image 600 and the high exposure image 610 is shown is set as a motion region 621.

Figure 6D:
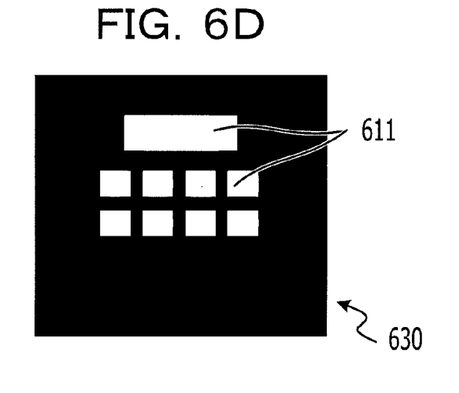
FIG. 6D illustrates an example of a combining mask in which the combining ratio obtained for each pixel on the basis of the combining table is represented in brightness, the combining table being determined on the basis of the low exposure image and the high exposure image.

FIG. 6D illustrates an example of a combining mask in which the combining ratio obtained for each pixel on the basis of a combining table is represented in brightness. The combining table is determined on the basis of the low exposure image 600 and the high exposure image 610. In a combining mask 630, the higher the combining ratio of the low exposure image for a pixel, the brighter the pixel; conversely, a pixel for which the combining ratio of the low exposure image is 0 is represented in black. In this example, regions 631 in the combining mask 630 corresponding to the regions 611, in which bright objects are shown in the high exposure image 610, are also represented in white because the combining ratio of the low exposure image is high. On the other hand, the surroundings of the region 631 are gray. This is because the combining ratio of the low exposure image is set such that the low exposure image is referred to, to some extent, in accordance with the SN ratio in the motion region 621.

Figure 6E:
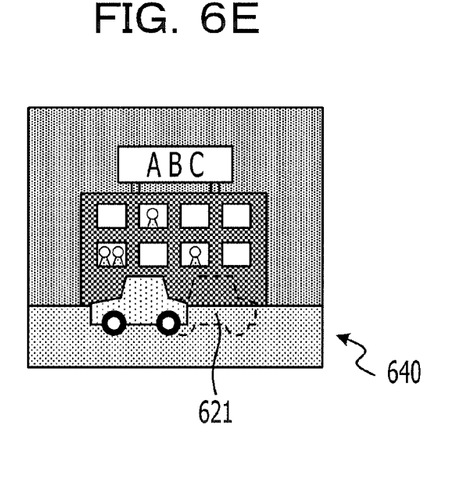
FIG. 6E illustrates an example of a combined image generated by way of combining the low exposure image and the high exposure image by the image combining device according to this embodiment.
Figure 6F:
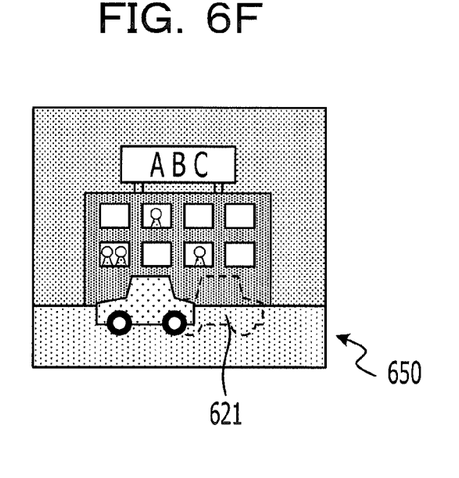
FIG. 6F illustrates an example of a combined image of the low exposure image and the high exposure image created using a conventional technology.

FIG. 6E illustrates an example of a combined image generated by way of combining the low exposure image 600 and the high exposure image 610 by the image combining device 1. As illustrated in FIG. 6E, in a combined image 640, the difference in the SN ratio between the motion region 621 and the surroundings of the region 621 is small, and the difference in subjective image quality between the inside and the outside of the motion region 621 is also small. In contrast, FIG. 6F illustrates an example of a combined image of the low exposure image 600 and the high exposure image 610 created using a conventional technology. In a combined image 650 created using the conventional technology, only signals of the corresponding region of the low exposure image are used for the motion region 621, whereas, signals of the corresponding region of the high exposure image are mainly used for the surroundings of the motion region 621. Therefore, the difference in image quality is significant between the inside and the outside of the motion region 621. As a result, the subjective image quality of the entire combined image 650 is not good.

Figure 7:
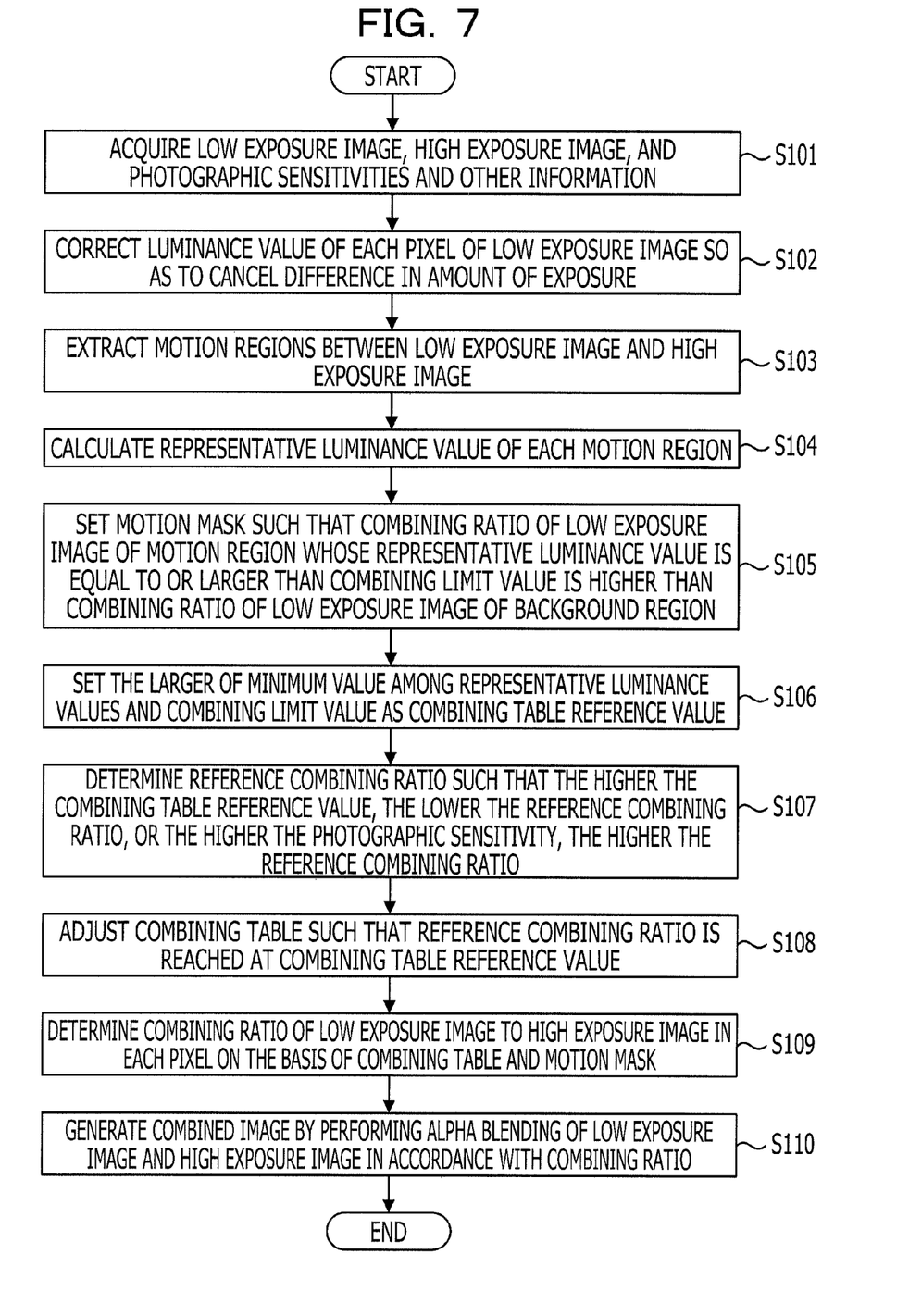
FIG. 7 is an operation flowchart of an image combining process.

FIG. 7 is an operation flowchart of an image combining process. The image combining device 1 performs this image combining process each time receiving a group of a low exposure image and a high exposure image.

The image combining device 1 acquires a low exposure image, a high exposure image, and photographic sensitivities and other information and stores them in the storage unit 11 (step S101). The luminance correction unit 12 expands the bit length representing the luminance value of each pixel of the high exposure image and the low exposure image and corrects the luminance value of each pixel of the low exposure image so as to cancel a difference in the amount of exposure between the high exposure image and the low exposure image (step S102).

The motion region extraction unit 13 extracts motion regions between the corrected low exposure image and the high exposure image (step S103). Then, the representative luminance determining unit 14 calculates the representative luminance value of each motion region (step S104). The motion mask generating unit 15 sets a motion mask such that the combining ratio of the low exposure image of the motion region whose representative luminance value is equal to or larger than a combining limit value is higher than the combining ratio of the low exposure image of a background region (step S105).

The combining table generating unit 16 sets the larger of the minimum value among representative luminance values and the combining limit value as a combining table reference value (step S106). The combining table generating unit 16 determines a reference combining ratio such that the higher the combining table reference value, the lower the reference combining ratio, or the higher the photographic sensitivity, the higher the reference combining ratio (step S107). Then, the combining table generating unit 16 adjusts a combining table such that the reference combining ratio is reached at the combining table reference value (step S108).

The combining ratio determining unit 17 determines the combining ratio of the low exposure image to the high exposure image in each pixel on the basis of the combining table and the motion mask (step S109). Then, the image combining unit 18 generates a combined image by performing alpha blending of the low exposure image and the high exposure image in accordance with the combining ratio (step S110). Then, the image combining device 1 outputs the combined image. After that, the image combining device 1 finishes the image combining process.

Note that the image combining device 1 may change the order of execution of processing of step S105 and processing of steps S106 to S108, or may execute them in parallel.

As described above, this image combining device increases the combining ratio of the low exposure image in the background region such that the lower the SN ratio in the motion region of the low exposure image, the higher the combining ratio of the low exposure image in the background region. Thus, this image combining device makes smaller a difference in the SN ratio between the motion region and the background region, thereby suppressing occurrence of an artifact in the motion region of the combined image. As a result, degradation in image quality of the combined image is suppressed. Moreover, this image combining device deletes a motion region whose representative luminance value is so low that it is presumed that the image quality of the low exposure image is not good, thereby determining the combining ratio for the deleted motion region so as to be similar to the combining ratio for the background region. In this way, this image combining device does not use the low exposure image or may decrease the combining ratio of the low exposure image, for a motion region where the image quality of the low exposure image is not good. This enables degradation in image quality of the combined image to be suppressed.

It is to be noted that the present disclosure is not limited to the above-mentioned embodiment. According to the modification, the representative luminance determining unit may use a statistical value, such as the minimum value among luminance values of pixels in each motion region of a corrected low exposure image, as a representative luminance value for the motion region. Since the corrected low exposure image is adjusted such that its luminance value is identical to the luminance value of the high exposure image for the identical amount of exposure, a representative luminance value determined on the basis of the corrected low exposure image is almost identical to a representative luminance value determined on the basis of the high exposure image.

According to another modification, the image combining device may combine a low exposure image and a high exposure image in accordance with expression (2) only for a motion region whose representative luminance value is equal to or larger than a combining limit value and the peripheral region set in the surroundings of the motion region. In this case, the combining table generating unit may generate a combining table for every motion region and its peripheral region by using the representative luminance value of that motion region as a combining table reference value. Therefore, the combining ratio determining unit also determines the combining ratio of the low exposure image using combining tables that differ for every motion region and its peripheral region. Thus, the image combining device may determine more appropriately, for every motion region, a combining ratio that decreases the difference in SN ratio between the motion region and its peripheral region. Note that the peripheral region may be a region in the form of a ring having a width of one half of the larger of the horizontal width and the vertical height of a motion region from the boundary of the motion region, for example.

In this modification, regarding a pixel having a saturated luminance value among pixels of the high exposure image in a background region that is neither included in the motion region nor in the peripheral region, the image combining unit may use the luminance value of the corresponding pixel of a corrected low exposure image as the luminance value of the corresponding pixel of a combined image.

According to still another modification, the reference combining ratio with respect to the combining table reference value may be changed depending on the combining table reference value only or the photographic sensitivity only.

According to still another modification, the image combining device may combine three or more images that differ in the amount of exposure from one another. In this case, the image combining device combines an image with the highest amount of exposure and an image with the second highest amount of exposure, for example, according to the above-mentioned embodiment or modification. Then, the image combining device combines the combined image and an image with the third highest amount of exposure according to the above-mentioned embodiment or modification. Similarly, the image combining device may repeat combining of the combined image and an image with an amount of exposure lower than those of two images used for the combining until there is no pixel having a saturated luminance value.

Figure 8:
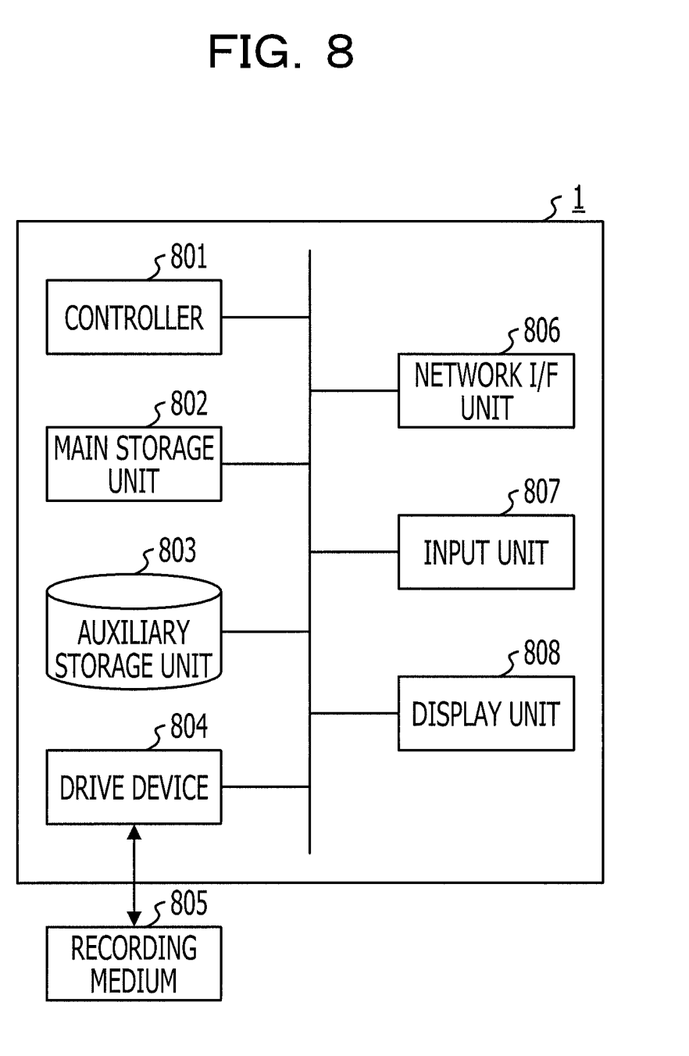
FIG. 8 is a block diagram illustrating a hardware configuration of an image combining device according to an embodiment.

FIG. 8 is a block diagram illustrating a hardware configuration of an image combining device according to an embodiment. As illustrated in FIG. 8, the image combining device 1 includes a controller 801, a main storage unit 802, an auxiliary storage unit 803, a drive device 804, a network interface (I/F) unit 806, an input unit 807, and a display unit 808. These components are mutually coupled via a bus so as to be able to transmit and receive data.

The controller 801 is a central processing unit (CPU) that performs control of devices, operations of data, and processing in a computer. The controller 801 is a computing unit for executing programs stored in the main storage unit 802 and the auxiliary storage unit 803, and the controller 801 receives data from the input unit 807 or a storage device, performs an operation and processing, and then outputs the data to the display unit 808 or a storage device, for example.

The main storage unit 802 is a read only memory (ROM), a random access memory (RAM), or the like, and is a storage device unit that stores or temporarily saves programs such as an operating system (OS), which is basic software, and application software to be executed by the controller 801.

The auxiliary storage unit 803 is a hard disk drive (HDD) or the like, and is a storage device that stores data relevant to application software and the like.

The drive device 804 reads a program from the recording medium 805, for example, a flexible disk, and installs the program in the auxiliary storage unit 803.

A given program is stored in the recording medium 805, and this program stored in the recording medium 805 is installed via the drive device 804 in the image combining device 1. The installed given program may be executed by the image combining device 1.

The network I/F 806 is an interface between peripheral equipment that has a communication function and the image combining device 1 coupled via a network, such as a local area network (LAN) or a wide area network (WAN), constructed of data transmission lines such as wire and/or wireless lines.

The input unit 807 includes a keyboard having cursor keys, number input keys, and various function keys, a mouse and a slice pad for selecting keys on a display screen of the display unit 808, and the like. The input unit 807 is a user interface for a user to give an operation instruction to the controller 801 and to input data.

The display unit 808 is made of a cathode ray tube (CRT), a liquid crystal display (LCD), or the like, and performs display responsive to display data input from the controller 801.

Note that the image combining process described above may be implemented as a program for causing a computer to execute this process. By installing the program from a server or the like and causing a computer to execute the program, the image combining process described above may be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A device that combines a first image photographed with a first amount of exposure and a second image photographed with a second amount of exposure lower than the first amount of exposure, thereby generating a combined image having a wider dynamic range than a dynamic range for the first amount of exposure of the first image and the second amount of exposure of the second image, the device comprising:
a processor; and
a memory which stores a plurality of instructions, which when executed by the processor, cause the processor to execute:
extracting at least one motion region in which an object moving between the first image and the second image is shown;
adjusting a combining ratio of the second image to the first image for a pixel in a background region outside of the at least one motion region, the combining ratio being adjusted such that the higher a luminance value of a pixel of the first image, the higher the combining ratio, and the combining ratio at a given luminance value is set such that the higher a ratio of a noise component to a signal component of a pixel of the at least one motion region in the second image, the higher the combining ratio at the given luminance value;
determining the luminance value of a pixel of the combined image in the at least one motion region on the basis of a luminance value of a corresponding pixel of the second image, and determining a luminance value of a pixel of the combined image in the background region as a value obtained by combining luminance values of corresponding pixels of the first image and the second image in accordance with the combining ratio, thereby generating the combined image; and
obtaining a representative luminance value for each of the at least one motion region in any of the first image and the second image, the representative luminance value being representative of luminance values in each of the at least one motion region;
wherein the obtaining of the representative luminance value sets the combining ratio at the given luminance value for the pixel in the background region such that the smaller a statistical luminance value that is a statistical central value for the representative luminance value of each of the at least one motion region, the higher the combining ratio at the given luminance value.

2. The device according to claim 1,
wherein the adjusting sets the combining ratio at the given luminance value such that the higher a photographic sensitivity of an image sensor that has generated the first image and the second image when the first image and the second image have been generated, the higher the combining ratio at the given luminance value.

3. The device according to claim 1,
wherein a plurality of motion regions including the at least one motion region are extracted, and
a motion region, among the plurality of motion regions, having a representative luminance value is less than a combining limit value that is a lower limit of representative luminance values for which image quality of the combined image is allowed is deleted.

4. The device according to claim 1,
wherein a combining limit value for the combining ratio is set such that the higher a photographic sensitivity of an image sensor that has generated the first image and the second image when the first image and the second image have been generated, the lower the combining limit value.

5. A method that combines a first image photographed with a first amount of exposure and a second image photographed with a second amount of exposure lower than the first amount of exposure, thereby generating a combined image having a wider dynamic range than a dynamic range for the first amount of exposure of the first image and the second amount of exposure of the second image, the method comprising:
extracting, by a processor, at least one motion region in which an object moving between the first image and the second image is shown;
adjusting a combining ratio of the second image to the first image for a pixel in a background region outside of the at least one motion region, the combining ratio being adjusted such that the higher a luminance value of a pixel of the first image, the higher the combining ratio, and the combining ratio at a given luminance value is set such that the higher a ratio of a noise component to a signal component of a pixel of the at least one motion region in the second image, the higher the combining ratio at the given luminance value;

determining the luminance value of a pixel of the combined image in the at least one motion region on the basis of a luminance value of a corresponding pixel of the second image, and determining a luminance value of a pixel of the combined image in the background region as a value obtained by combining luminance values of corresponding pixels of the first image and the second image in accordance with the combining ratio, thereby generating the combined image; and obtaining a representative luminance value for each of the at least one motion region in any of the first image and the second image, the representative luminance value being representative of luminance values in each of the at least one motion region;

wherein the obtaining of the representative luminance value sets the combining ratio at the given luminance value for the pixel in the background region such that the smaller a statistical luminance value that is a statistical central value for the representative luminance value of each of the at least one motion region, the higher the combining ratio at the given luminance value.

6. The method according to claim 5, wherein the combining ratio at the given luminance value is set such that the higher a photographic sensitivity of an image sensor that has generated the first image and the second image when the first image and the second image have been generated, the higher the combining ratio at the given luminance value.

7. The method according to claim 5, wherein a plurality of motion regions including the at least one motion region are extracted, and a motion region, among the plurality of motion regions, whose representative luminance value is less than a combining limit value that is a lower limit of representative luminance values for which image quality of the combined image is allowed is deleted, even with use of a luminance value of a pixel in the motion region of the second image for generation of the combined image.

8. The method according to claim 5, wherein a combining limit value for the combining ratio is set such that the higher a photographic sensitivity of an image sensor that has generated the first image and the second image when the first image and the second image have been generated, the lower the combining limit value.

9. A non-transitory computer-readable storage medium storing an image combining program that combines a first image photographed with a first amount of exposure and a second image photographed with a second amount of exposure lower than the first amount of exposure, thereby generating a combined image having a wider dynamic range than a dynamic range for the first amount of exposure of the first image and the second amount of exposure of the second image, the image combining program causing a computer to execute a process comprising:

extracting, by a processor, at least one motion region in which an object moving between the first image and the second image is shown;

adjusting a combining ratio of the second image to the first image for a pixel in a background region outside of the at least one motion region, the combining ratio being adjusted such that the higher a luminance value of a pixel of the first image, the higher the combining ratio, and the combining ratio at a given luminance value is set such that the higher a ratio of a noise component to a signal component of a pixel of the at least one motion region in the second image, the higher the combining ratio at the given luminance value;

determining the luminance value of a pixel of the combined image in the at least one motion region on the basis of a luminance value of a corresponding pixel of the second image, and determining a luminance value of a pixel of the combined image in the background region as a value obtained by combining luminance values of corresponding pixels of the first image and the second image in accordance with the combining ratio, thereby generating the combined image; and obtaining a representative luminance value for each of the at least one motion region in any of the first image and the second image, the representative luminance value being representative of luminance values in each of the at least one motion region;

wherein the obtaining of the representative luminance value sets the combining ratio at the given luminance value for the pixel in the background region such that the smaller a statistical luminance value that is a statistical central value for the representative luminance value of each of the at least one motion region, the higher the combining ratio at the given luminance value.

10. The device according to claim 1, further comprising:
wherein a plurality of motion regions including the at least one motion region are extracted, and
wherein the combining ratio at the given luminance value for the pixel in the background region is adjusted such that the smaller the luminance values of the plurality of motion regions, the higher the combining ratio at the given luminance value.

11. The device according to claim 1, wherein a combining table is updated according to the adjusting.

* * * * *